No. 697,343. Patented Apr. 8, 1902.
G. C. LATHROP.
FEED AND WATER DEVICE FOR CHICKENS.
(Application filed July 16, 1901.)
(No Model.)
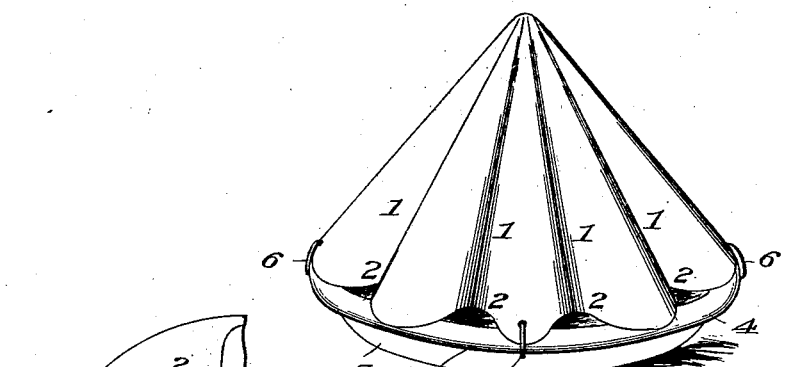
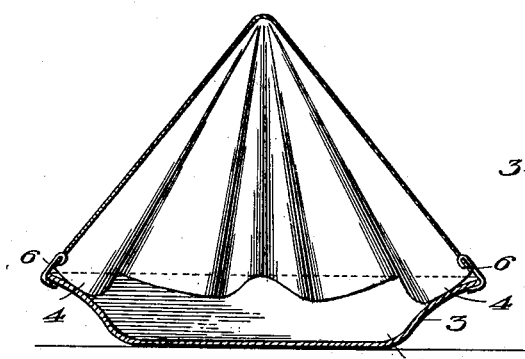
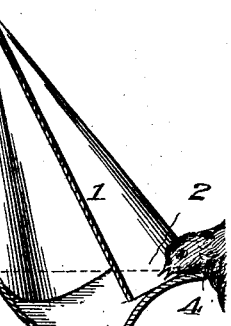
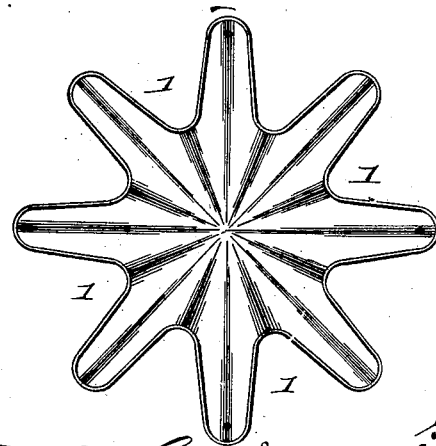
Witnesses
Inventor
George C. Lathrop
by Johnson & Johnson
Attorneys

UNITED STATES PATENT OFFICE.

GEORGE CHARLES LATHROP, OF WASHINGTON, DISTRICT OF COLUMBIA.

FEED AND WATER DEVICE FOR CHICKENS.

SPECIFICATION forming part of Letters Patent No. 697,343, dated April 8, 1902.

Application filed July 16, 1901. Serial No. 68,473. (No model.)

*To all whom it may concern:*

Be it known that I, GEORGE CHARLES LATHROP, a citizen of the United States, residing at the city of Washington, in the District of Columbia, have invented certain new and useful Improvements in Feed and Water Devices for Chickens, of which the following is a specification.

The object of my improvement is to provide a feed and watering device wherein chickens are prevented from getting within and polluting the food or water contained therein, and the device for this purpose comprises a vertically-corrugated part having a plurality of contiguous troughs on its walls and a seating-basin into which the troughs open at the seating end of the device, whereby water or food contained in the basin is exposed at the lower end of each trough into which the chicken can only put its head and eat or drink, each chicken thereby feeding from a trough independent of the others from the same basin. For the feeding and watering of chicks the device is specially designed and is illustrated in—

Figure 1 in perspective, in which a vertically-troughed body of conical form is seated with its wall-formed troughs opening at their lower ends into the food and water receptacle. Fig. 2 is a vertical section of the same. Fig. 3 is a partial top view, and Fig. 4 a partial vertical section. Fig. 5 shows the corrugated conical trough as it is produced from sheet metal, the radial corrugations being seen from the under side.

In the drawings the preferred form of the body or trough cover is shown conical, with its troughs 1 produced from a sheet of metal of circular form; but the trough-forming body may be of any shape, the walls of which will admit of being formed into a plurality of continuous vertical troughs at the lower ends of which the chickens feed. I prefer the conical form, because the troughs increase in depth from the apex to the base of the cone, and this increased depth at the base thereby gives increased width to the troughs at their open seating ends 2 in the feed and water receptacle and gives full room for the head of the chick while feeding or drinking. For this purpose the troughed device is seated within a pan or basin 3, into which the deepest and widest ends of the troughs open. For this purpose the open ends 2 of the troughs preferably rest upon the raised rim part 4 of the basin, while the bottom of the basin may be raised either conical or convex, so as to form a gutter 5 around the base of the raised rim. In this gutter the ends of the troughs open, and the food is held in the troughs within convenient reach of the chickens around the base of the trough device. The upward sloping of the bottoms of the trough to the apex gives freedom for the entrance of the heads of the chickens into the troughs at the gutter into which they open.

I have stated that the bottom of the basin may be of conical or raised convex form; but obviously a flat bottom will form a drinking recess or shallow chamber beneath the group of troughs and hold the water outside of and around the open ends of the troughs.

It is important to note that all troughs are grouped in a compact form, so that the widest end of each is in communication with the basin. It is also important to note the seating of a body having troughs in its walls upon and over the tray, pan, or basin forms a cover or sort of barricade to prevent the chicks from getting into it and fouling the food or water.

The basin may be of any desired form and size, and the device can be used within and without the poultry-closure. It can be set anywhere and supplied with food or with water for broods of chicks and both the trough and the basin as separate parts kept clean.

It will be understood that in using the device for feeding the food will be placed in the hollows between the walls of the troughs, within which the basin serves to hold the food; but for drinking the basin is kept supplied with water and the troughs free of food. In these particulars the device is well adapted for the feeding and watering of young chickens.

As the corrugated trough device rests upon the basin without some means for holding it central or in proper position with relation to the basin, it would be liable to be shoved to one side of or off the basin, and to prevent this I provide the troughs at two or more points at the corners of their lower edges with hooks 6, preferably of wire, adapted to hook over and under the edge of the basin, and I prefer that the outer corners of the corrugations which form the troughs be at the outer edge of the basin, so that each trough is bounded by the edge of the basin and the walls of the corrugations for containing the food, while as a watering device each trough opens into the basin within the base of its rim.

In Fig. 3 is seen the trough-walls rising from the rimmed part of the basin and the opening between the trough-walls at which the chickens eat, while in Fig. 4 is seen how the troughs when containing no food open into the conical bottom of the basin for drinking.

I claim—

1. A feed and water device for poultry consisting of a pan or basin and a conical body or cover having a plurality of corrugated continuous troughs each of which increases in width and in depth toward the base and terminates in an open end.

2. A feeding and watering device for poultry consisting of vertically-inclined corrugated walls forming contiguous and continuous troughs open at their lower ends, and a pan or basin the rim of which forms a seat for the lower ends of the troughs.

3. In a feeding and watering device for poultry, the combination with a corrugated device forming a plurality of vertically-inclined contiguous and continuous troughs open at their lower ends, a pan or basin the rim of which forms a seat for the lower ends of the troughs, and hooks on the outer ridges of the corrugations adapted to detachably engage the edge of the basin to hold the separate trough part in proper relation thereto.

In testimony whereof I affix my signature in presence of two witnesses.

GEORGE CHARLES LATHROP.

Witnesses:
A. ROLAND JOHNSON,
GUY H. JOHNSON.